(12) United States Patent
Zweigle et al.

(10) Patent No.: US 10,282,854 B2
(45) Date of Patent: May 7, 2019

(54) TWO-DIMENSIONAL MAPPING SYSTEM AND METHOD OF OPERATION

(71) Applicant: FARO Technologies, Inc., Lake Mary, FL (US)

(72) Inventors: Oliver Zweigle, Stuttgart (DE); Aleksej Frank, Stuttgart (DE); Bernd-Dietmar Becker, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 30 days.

(21) Appl. No.: 15/729,010

(22) Filed: Oct. 10, 2017

(65) Prior Publication Data

US 2018/0101961 A1     Apr. 12, 2018

Related U.S. Application Data

(60) Provisional application No. 62/407,183, filed on Oct. 12, 2016.

(51) Int. Cl.
*G06T 7/33* (2017.01)
*G06T 7/521* (2017.01)
(Continued)

(52) U.S. Cl.
CPC ............ *G06T 7/337* (2017.01); *B23K 26/082* (2015.10); *G01S 7/4808* (2013.01); *G01S 17/89* (2013.01);
(Continued)

(58) Field of Classification Search
None
See application file for complete search history.

(56) References Cited

U.S. PATENT DOCUMENTS

| 6,246,468 B1 | 6/2001 | Dimsdale |
| 6,542,249 B1 | 4/2003 | Kofman et al. |

(Continued)

FOREIGN PATENT DOCUMENTS

| DE | 102009035336 A1 | 11/2010 |
| DE | 102012109481 A1 | 4/2014 |

(Continued)

OTHER PUBLICATIONS

Nüchter, Andreas, et al. "Heuristic-based laser scan matching for outdoor 6D SLAM." Annual Conference on Artificial Intelligence. Springer, Berlin, Heidelberg, 2005.*

(Continued)

*Primary Examiner* — Sultana M Zalalee
(74) *Attorney, Agent, or Firm* — Cantor Colburn LLP

(57) ABSTRACT

A method and system of generating a two-dimensional map with an optical scanner is provided. The method comprises acquiring coordinate data of points in an area being scanned with a mobile optical scanner. A current 2D map from the coordinate data is generated. A copy of the current 2D map is saved on a periodic or aperiodic basis. At least one data registration error is identified in the current 2D map. The saved copy of the current 2D map from a point in time prior to the registration error is determined. A second data set of coordinate data acquired after the determined saved copy is identified. The second data set is aligned to the determined saved copy to form a new current 2D map. The new current 2D map is stored in memory.

19 Claims, 16 Drawing Sheets

(51) Int. Cl.
*G06T 11/60* (2006.01)
*G01S 17/89* (2006.01)
*B23K 26/082* (2014.01)
*G01S 7/48* (2006.01)

(52) U.S. Cl.
CPC .............. *G06T 7/521* (2017.01); *G06T 11/60* (2013.01); *G06T 2200/04* (2013.01); *G06T 2207/10028* (2013.01); *G06T 2207/20108* (2013.01); *G06T 2207/20221* (2013.01); *G06T 2210/04* (2013.01)

(56) References Cited

U.S. PATENT DOCUMENTS

| | | |
|---|---|---|
| 7,069,124 B1 | 6/2006 | Whittaker et al. |
| 8,384,914 B2 | 2/2013 | Becker et al. |
| 8,625,106 B2 | 1/2014 | Ossig et al. |
| 8,699,007 B2 | 4/2014 | Becker et al. |
| 8,699,036 B2 | 4/2014 | Ditte et al. |
| 8,705,012 B2 | 4/2014 | Greiner et al. |
| 8,705,016 B2 | 4/2014 | Schumann et al. |
| 8,730,477 B2 | 5/2014 | Ruhland et al. |
| 8,811,767 B2 | 8/2014 | Veeraraghaven et al. |
| 8,830,485 B2 | 9/2014 | Woloschyn |
| 8,896,819 B2 | 11/2014 | Schumann et al. |
| 8,970,823 B2 | 3/2015 | Heidemann et al. |
| 9,074,883 B2 | 7/2015 | Schumann et al. |
| 9,279,662 B2 | 3/2016 | Steffey et al. |
| 9,329,271 B2 | 5/2016 | Ossig et al. |
| 9,342,890 B2 | 5/2016 | Becker et al. |
| 9,372,265 B2 | 6/2016 | Zweigle et al. |
| 9,417,316 B2 | 8/2016 | Schumann et al. |
| 9,513,107 B2 | 12/2016 | Zweigle et al. |
| 9,599,455 B2 | 3/2017 | Heidemann et al. |
| 9,618,620 B2 | 4/2017 | Zweigle et al. |
| 9,739,886 B2 | 8/2017 | Zweigle et al. |
| 9,746,559 B2 | 8/2017 | Zweigle et al. |
| 2004/0027347 A1 | 2/2004 | Farsaie |
| 2006/0110026 A1 | 5/2006 | Strassenburg-Kleciak |
| 2010/0134596 A1 | 6/2010 | Becker |
| 2011/0288684 A1 | 11/2011 | Farlow et al. |
| 2012/0069352 A1 | 3/2012 | Ossig et al. |
| 2013/0314688 A1 | 11/2013 | Likholyot |
| 2014/0005933 A1* | 1/2014 | Fong .................... G05D 1/0274 701/447 |
| 2014/0063489 A1 | 3/2014 | Steffey et al. |
| 2014/0078519 A1 | 3/2014 | Steffey et al. |
| 2014/0226190 A1 | 8/2014 | Bridges et al. |
| 2014/0240690 A1 | 8/2014 | Newman et al. |
| 2014/0300906 A1 | 10/2014 | Becker et al. |
| 2014/0362424 A1 | 12/2014 | Bridges et al. |
| 2015/0085068 A1 | 3/2015 | Becker et al. |
| 2015/0085301 A1 | 3/2015 | Becker et al. |
| 2015/0160342 A1 | 6/2015 | Zweigle et al. |
| 2015/0160347 A1* | 6/2015 | Zweigle ............... G09B 29/004 356/5.01 |
| 2016/0047914 A1 | 2/2016 | Zweigle et al. |
| 2018/0075643 A1* | 3/2018 | Sequeira .............. G01C 21/206 |

FOREIGN PATENT DOCUMENTS

| | | |
|---|---|---|
| WO | 2013103725 A1 | 7/2013 |
| WO | 2014128498 A2 | 8/2014 |

OTHER PUBLICATIONS

Great Britain Search Report for Application No. GB171667.8 dated Mar. 28, 2018; 4 pgs.

Brenneke et al: "Using 3D laser range data for slam in outdoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.

Davidson, A. et al., "MonoSLAM: Real-Time Single Camera SLAM", IEEE Transactions on Pattern Analysis and Machine Intelligence, vol. 29, No. 6, Jun. 1, 2007, pp. 1052-1067, XP011179664.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

Harrison A. et al., "High Quality 3D Laser Ranging Under General Vehicle Motion", 2008 IEEE International Conference on Robotics and Automation, May 19-23, 2008, pp. 7-12, XP031340123.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.

Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pp. 1114-1116.

Ye, C. et al., "Characterization of a 2-D Laser Scanner for Mobile Robot Obstacle Negotiation" Proceedings / 2002 IEEE International Conference on Robotics and Automation, May 11-15, 2002, Washington, D.C., May 1, 2002, pp. 2512-2518, XP009169742.

\* cited by examiner

2D Scanner
Frame of Reference

Object
Frame of Reference

TWO-DIMENSIONAL MAPPING SYSTEM AND METHOD OF OPERATION

CROSS REFERENCE TO RELATED APPLICATIONS

The present application is a nonprovisional application of U.S. Provisional Application Ser. No. 62/407,183 filed on Oct. 12, 2016, the contents of which are incorporated by reference herein.

BACKGROUND

The present application is directed to a system for generating a two-dimensional map of an area, such as a building for example, and in particular to a two-dimensional mapping system that accommodates moving objects, such as doors.

Metrology devices, such as a 3D laser scanner time-of-flight (TOF) coordinate measurement devices for example, may be used to generate three dimensional representations of areas, such as buildings for example. A 3D laser scanner of this type steers a beam of light to a non-cooperative target such as a diffusely scattering surface of an object. A distance meter in the device measures a distance to the object, and angular encoders measure the angles of rotation of two axles in the device. The measured distance and two angles enable a processor in the device to determine the 3D coordinates of the target.

A TOF laser scanner is a scanner in which the distance to a target point is determined based on the speed of light in air between the scanner and a target point. Laser scanners are typically used for scanning closed or open spaces such as interior areas of buildings, industrial installations and tunnels. They may be used, for example, in industrial applications and accident reconstruction applications. A laser scanner optically scans and measures objects in a volume around the scanner through the acquisition of data points representing object surfaces within the volume. Such data points are obtained by transmitting a beam of light onto the objects and collecting the reflected or scattered light to determine the distance, two-angles (i.e., an azimuth and a zenith angle), and optionally a gray-scale value. This raw scan data is collected, stored and sent to a processor or processors to generate a 3D image representing the scanned area or object.

Some systems use the three-dimensional data to generate a two-dimensional map or floor plan of the area being scanned. As the TOF laser scanner is moved, an accurate 2D map of the area (e.g. an as-build floor plan) may be generated. It should be appreciated that this may be used in the planning of construction or remodeling of a building for example. Issues sometimes arise during the scanning process that results in errors in a map. These errors may be due to a mis-registration of newly acquired data with an earlier data set. These mis-registrations may occur for example when a natural feature in the environment used by the system for registration is moved. Other errors may occur due to ambiguities in the data set.

For example, in the map 20 of FIG. 1, a scan is performed that generates a two-dimensional map of a hallway 22. As the operator opens the door 24 to proceed into the room 26, the system uses the edge of the door as a reference point for registration of the data. As a result, when the room 26 is scanned and the data is combined with that from hallway 22, the room 26 will be rotated on the map relative to the hallway 22, resulting in an improperly oriented room 28.

Accordingly, while existing two-dimensional mapping systems are suitable for their intended purposes, what is needed is a mapping system having certain features of embodiments of the present invention.

BRIEF DESCRIPTION

According to one aspect of the invention, a method and system of generating a two-dimensional map with an optical scanner is provided. The method comprises acquiring coordinate data of points in an area being scanned with a mobile optical scanner. A current 2D map from the coordinate data is generated. A copy of the current 2D map is saved on a periodic or aperiodic basis. At least one data registration error is identified in the current 2D map. The saved copy of the current 2D map from a point in time prior to the registration error is determined. A second data set of coordinate data acquired after the determined saved copy is identified. The second data set is aligned to the determined saved copy to form a new current 2D map. The new current 2D map is stored in memory.

In a further aspect of the invention, another method and system of generating a two-dimensional map with a scanner is provided. The method comprising acquiring a first set coordinate data with an optical scanner. It is determined that a predetermined amount of time has elapsed or a predetermined distance has been scanned. A first copy of a two-dimensional map generated from the first set of coordinate data acquired during the predetermined amount of time or the predetermined distance is stored in memory of a processor operably coupled to the optical scanner. A second set of coordinate data is acquired with the optical scanner. A current two-dimensional map based is generated at least in part on the first set of coordinate data and the second set of coordinate data. A registration error is determined in the current two-dimensional map. It is determined that the first copy does not include the registration error. The second set of coordinate data is registered with the first copy. The current two-dimensional map is replaced with a new two-dimensional map based at least in part on the registration of the second set of coordinate data to the first copy.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

The present invention relates to a device that includes a 3D scanner and a 2D scanner working cooperatively to provide automatic registration of 3D scans in environments having moving objects, such as doors for example.

Figure 2:
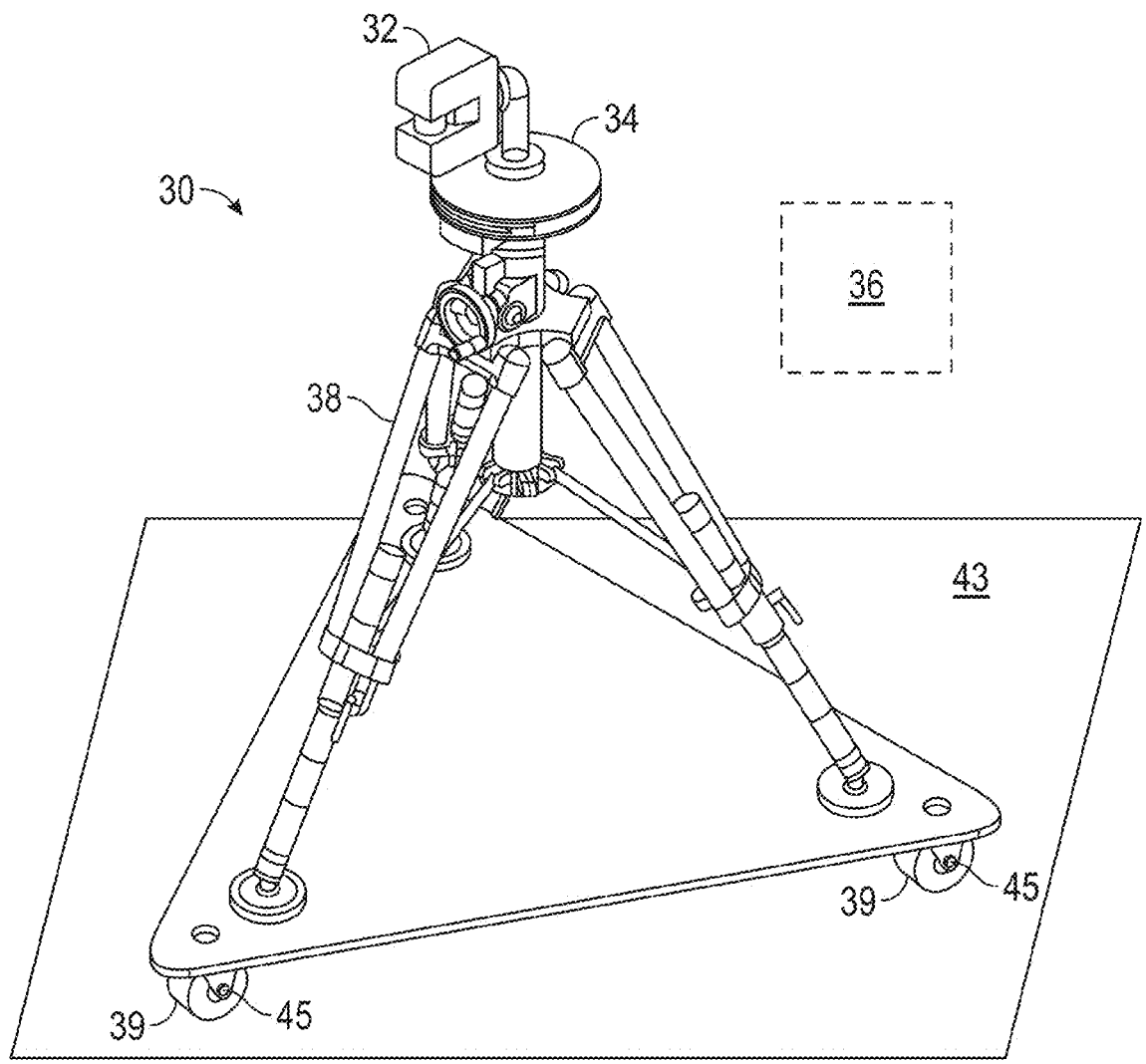
FIG. 2 is a perspective view of a measuring system according to an embodiment.

Referring now to FIG. 2, an embodiment is shown of a measurement system 30 that may be used to generate two dimensional maps of an area. The measurement system 30 includes a three-dimensional (3D) scanner 32, a two-dimensional (2D) scanner 34, a processor system 36 and a movable platform 38. The movable platform 38 may include a plurality of wheels 40 configured to move the platform 38 about a surface 43. In an embodiment, each of the wheels may have a locking mechanism 42 that prevents the mobile platform 38 from moving when the locks are engaged.

Figure 3:
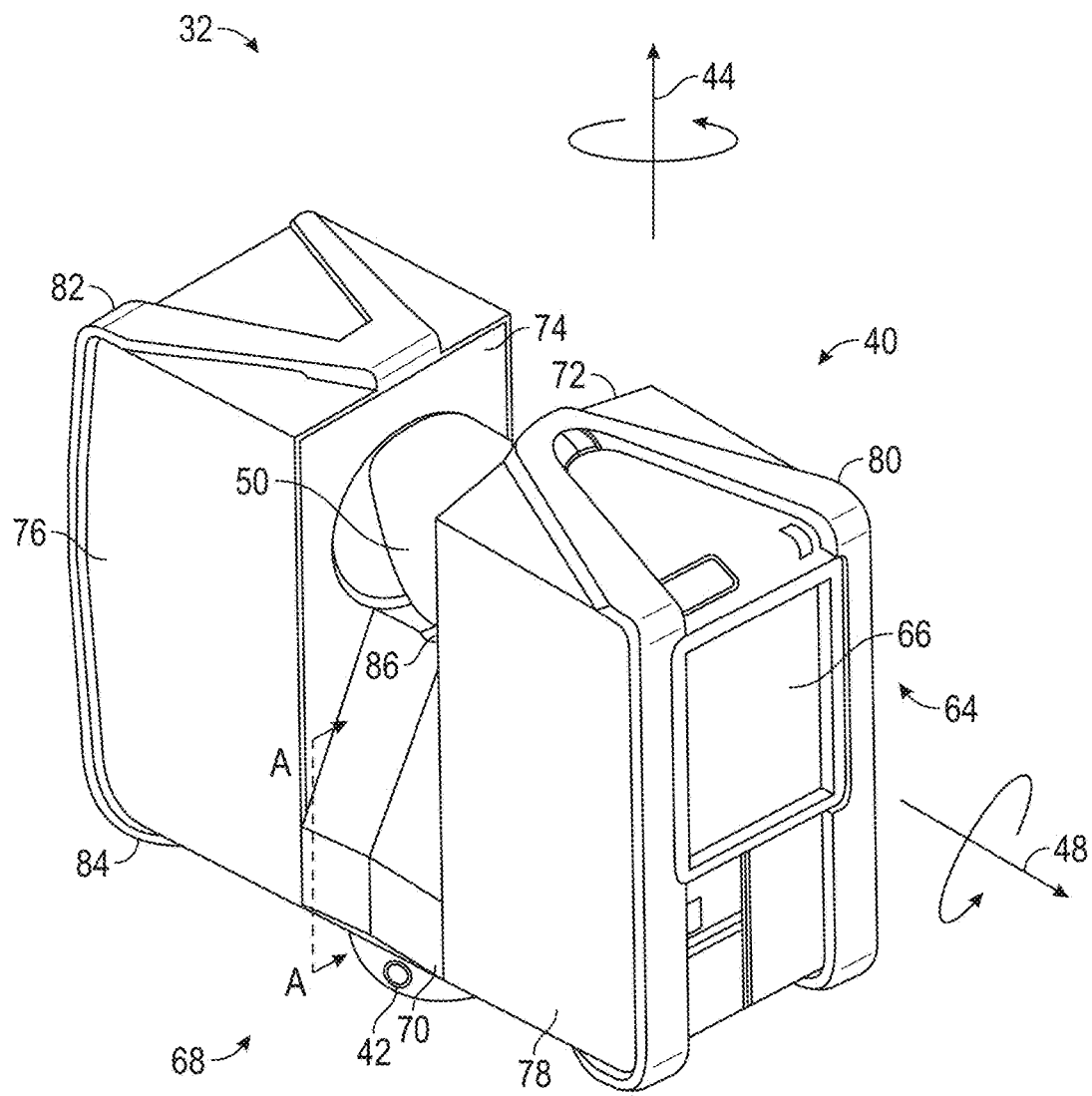
FIG. 3 is a perspective view of a laser scanner in accordance with an embodiment of the invention.
Figure 4:
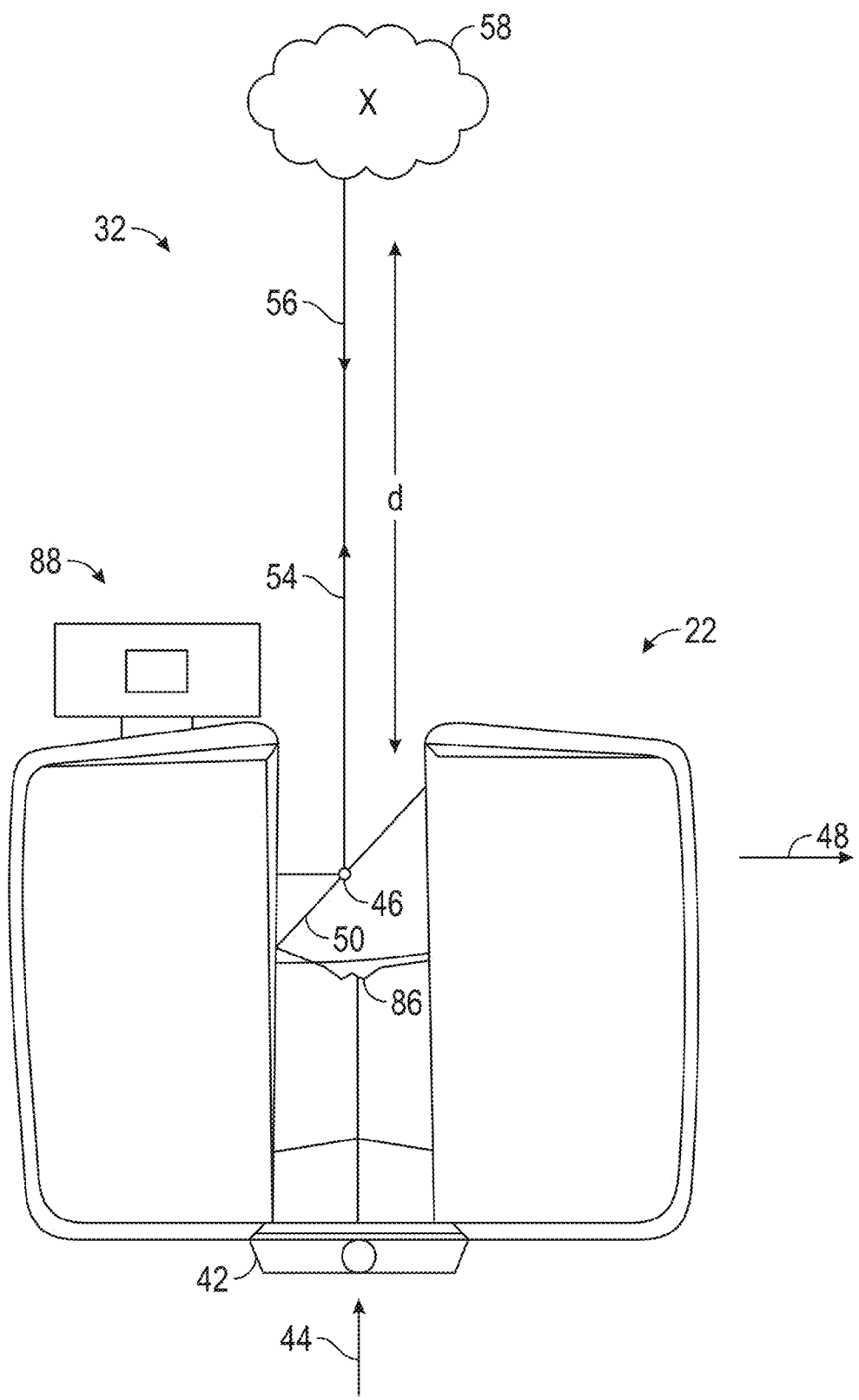
FIG. 4 is a side view of the laser scanner illustrating a method of measurement.
Figure 5:
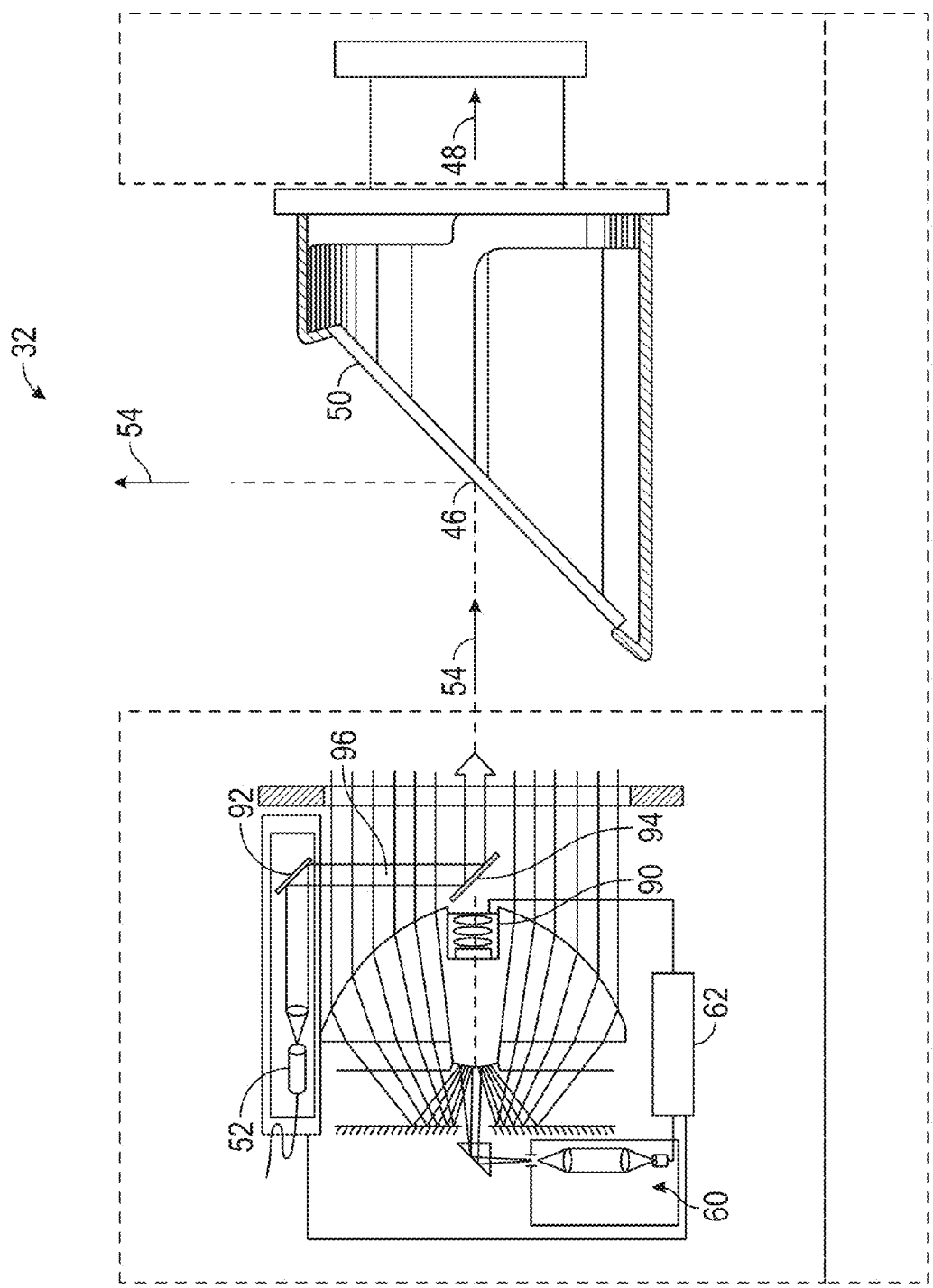
FIG. 5 is a schematic illustration of the optical, mechanical, and electrical components of the laser scanner.

Referring now to FIGS. 3-5, the laser scanner 32 is shown for optically scanning and measuring the environment surrounding the laser scanner 32. In the embodiment of FIG. 2, the laser scanner 32 is configured what may be referred to as a "horizontal mode." As will be discussed in more detail herein, in a horizontal mode, the laser scanner 32 emits laser light in a plane that is generally parallel with the surface 43. This allows for the acquisition of the 2D coordinate data of the surrounding objects that are in the plane of the emitted laser light. It should be appreciated that in other embodiments, the laser scanner 32 may be oriented vertically or on an angle relative to the surface 43.

The laser scanner 32 has a measuring head 40 and a base 42. The measuring head 40 is mounted on the base 42. In embodiments where the laser scanner is acquiring 3D coordinate data, the laser scanner 32 may be rotated on the base 42 about a first axis 44. When oriented in the horizontal mode, the first axis 44 may be in the direction of movement of the system 30. In one embodiment, the measuring head 40 includes a gimbal point 46 that is a center of rotation about the first axis 44 and a second axis 48. When operating in a horizontal mode, the first axis 44 and the second axis 48 may define a plane that is general parallel with the surface 43.

The measuring head 40 has a rotary mirror 50, which may be rotated about the second axis 48. The rotation about the vertical axis may be about the center of the base 42. The terms vertical axis and horizontal axis refer to the scanner in its normal upright position. In other words, when in horizontal mode the axis 44 extending approximately parallel to the floor or ground and the axis 48 being approximately perpendicular with the floor or ground. It should be appreciated that it is also possible to operate a 3D coordinate measurement device on its side or upside down, when in a vertical modes, the terms azimuth axis and zenith axis may be substituted for the terms first axis and second axis, respectively. The term pan axis or standing axis may also be used as an alternative nomenclature for the vertical axis.

The measuring head 40 is further provided with an electromagnetic radiation emitter, such as light emitter 52, for example, that emits an emitted light beam 54. In one embodiment, the emitted light beam 54 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 54 may be amplitude or intensity modulated, for example, with a sinusoidal waveform or with a rectangular waveform. The emitted light beam 54 is emitted by the light emitter 52 onto the rotary mirror 50, where it is deflected to the environment. A reflected light beam 56 is reflected from the environment by an object 58. The reflected or scattered light is intercepted by the rotary mirror 50 and directed into a light receiver 60. When in a horizontal mode, the emitted light beam 54 and the reflected light beam 56 are in the plane defined by the axis 44, 48. The directions of the emitted light beam 54 and the reflected light beam 56 result from the angular positions of the rotary mirror 50 the axis 48. These angular positions in turn depend on the corresponding rotary drives or motors. It should be appreciated that where the laser scanner 32 is acquiring three-dimensional data, The directions of the emitted light beam 54 and the reflected light beam 56 result from the angular positions of the rotary mirror 50 and the base 42 about the axes 44, 48 respectively.

Coupled to the light emitter 52 and the light receiver 60 is a controller 62. The controller 62 determines, for a multitude of measuring points X, a corresponding number of distances d between the laser scanner 32 and the points X on object 58. The distance to a particular point X is determined based at least in part on the speed of light in air through which electromagnetic radiation propagates from the device to the object point X. In one embodiment the phase shift of modulation in light emitted by the laser scanner 32 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation (i.e. "vertical mode"), the scanning of the volume around the laser scanner 20 takes place by rotating the rotary mirror 26 about axis 25 relatively quickly while rotating the measuring head 22 about axis 23 relatively slowly, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 46 to an object point X, the scanner 30 may also collect gray-scale information related to the received optical power (equivalent to the term "brightness.") The gray-scale value may be determined at least in part, for example, by integration of the bandpass-filtered and amplified signal in the light receiver 60 over a measuring period attributed to the object point X.

The measuring head 40 may include a display device 64 integrated into the laser scanner 32. The display device 64 may include a graphical touch screen 66, as shown in FIG. 3, which allows the operator to set the parameters or initiate the operation of the laser scanner 32. For example, the screen 66 may have a user interface that allows the operator to provide measurement instructions to the device, and the screen may also display measurement results.

The laser scanner 32 includes a carrying structure 68 that provides a frame for the measuring head 40 and a platform for attaching the components of the laser scanner 32. In one embodiment, the carrying structure 68 is made from a metal such as aluminum. The carrying structure 68 includes a traverse member 70 having a pair of walls 72, 74 on opposing ends. The walls 72, 74 are parallel to each other and extend in a direction opposite the base 42. Shells 76, 78 are coupled to the walls 72, 74 and cover the components of the laser scanner 32. In the exemplary embodiment, the shells 76, 78 are made from a plastic material, such as polycarbonate or polyethylene for example. The shells 76, 78 cooperate with the walls 72, 74 to form a housing for the laser scanner 32.

On an end of the shells 76, 78 opposite the walls 72, 74 a pair of yokes 80, 82 are arranged to partially cover the respective shells 76, 78. In the exemplary embodiment, the yokes 80, 82 are made from a suitably durable material, such as aluminum for example, that assists in protecting the shells 76, 78 during transport and operation. The yokes 80, 82 each includes a first arm portion 84 that is coupled, such as with a fastener for example, to the traverse 70 adjacent the base 42. The arm portion 84 for each yoke 80, 82 extends from the traverse 70 obliquely to an outer corner of the respective shell 76, 78. From the outer corner of the shell, the yokes 80, 82 extend along the side edge of the shell to an opposite outer corner of the shell. Each yoke 80, 82 further includes a second arm portion that extends obliquely to the walls 72, 74. It should be appreciated that the yokes 80, 82 may be coupled to the traverse 70, the walls 72, 74 and the shells 76, 78 at multiple locations.

The pair of yokes 80, 82 cooperate to circumscribe a convex space within which the two shells 76, 78 are arranged. In the exemplary embodiment, the yokes 80, 82 cooperate to cover all of the outer edges of the shells 76, 78, while the top and bottom arm portions project over at least a portion of the top and bottom edges of the shells 76, 78. This provides advantages in protecting the shells 76, 78 and the measuring head 40 from damage during transportation and operation. In other embodiments, the yokes 80, 82 may include additional features, such as handles to facilitate the carrying of the laser scanner 32 or attachment points for accessories for example.

On top of the traverse 70, a prism 86 is provided. The prism 86 extends parallel to the walls 72, 74. In the exemplary embodiment, the prism 86 is integrally formed as part of the carrying structure 68. In other embodiments, the prism 86 is a separate component that is coupled to the traverse 70. When the mirror 50 rotates, during each rotation the mirror 50 directs the emitted light beam 54 onto the traverse 70 and the prism 86. Due to non-linearities in the electronic components, for example in the light receiver 60, the measured distances d may depend on signal strength, which may be measured in optical power entering the scanner or optical power entering optical detectors within the light receiver 56, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 60. Since the prism 86 is at a known distance from the gimbal point 46, the measured optical power level of light reflected by the prism 86 may be used to correct distance measurements for other measured points, thereby allowing for compensation to correct for the effects of environmental variables such as temperature. In the exemplary embodiment, the resulting correction of distance is performed by the controller 62.

In an embodiment, the base 42 is coupled to a swivel assembly (not shown) such as that described in commonly owned U.S. Pat. No. 8,705,012 ('012), which is incorporated by reference herein. The swivel assembly is housed within the carrying structure 68 and includes a motor that is configured to rotate the measurement head 40 about the axis 44.

In an embodiment, a camera (first image acquisition device) 90 is located internally to the scanner 30 and may have the same optical axis as the 3D scanner device. In this embodiment, the first image acquisition device 90 is integrated into the measuring head 40 and arranged to acquire images along the same optical pathway as emitted light beam 54 and reflected light beam 56. In this embodiment, the light from the light emitter 52 reflects off a fixed mirror 92 and travels to dichroic beam-splitter 94 that reflects the light 96 from the light emitter 52 onto the rotary mirror 50. The dichroic beam-splitter 94 allows light to pass through at wavelengths different than the wavelength of light 96. For example, the light emitter 52 may be a near infrared laser light (for example, light at wavelengths of 780 nm or 1150 nm), with the dichroic beam-splitter 94 configured to reflect the infrared laser light while allowing visible light (e.g., wavelengths of 400 to 700 nm) to transmit through. In other embodiments, the determination of whether the light passes through the beam-splitter 94 or is reflected depends on the polarization of the light. The digital camera 90 acquires 2D photographic images of the scanned area to capture color data (texture) to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 44 and by steering the mirror 50 about the axis 48.

Figure 6:
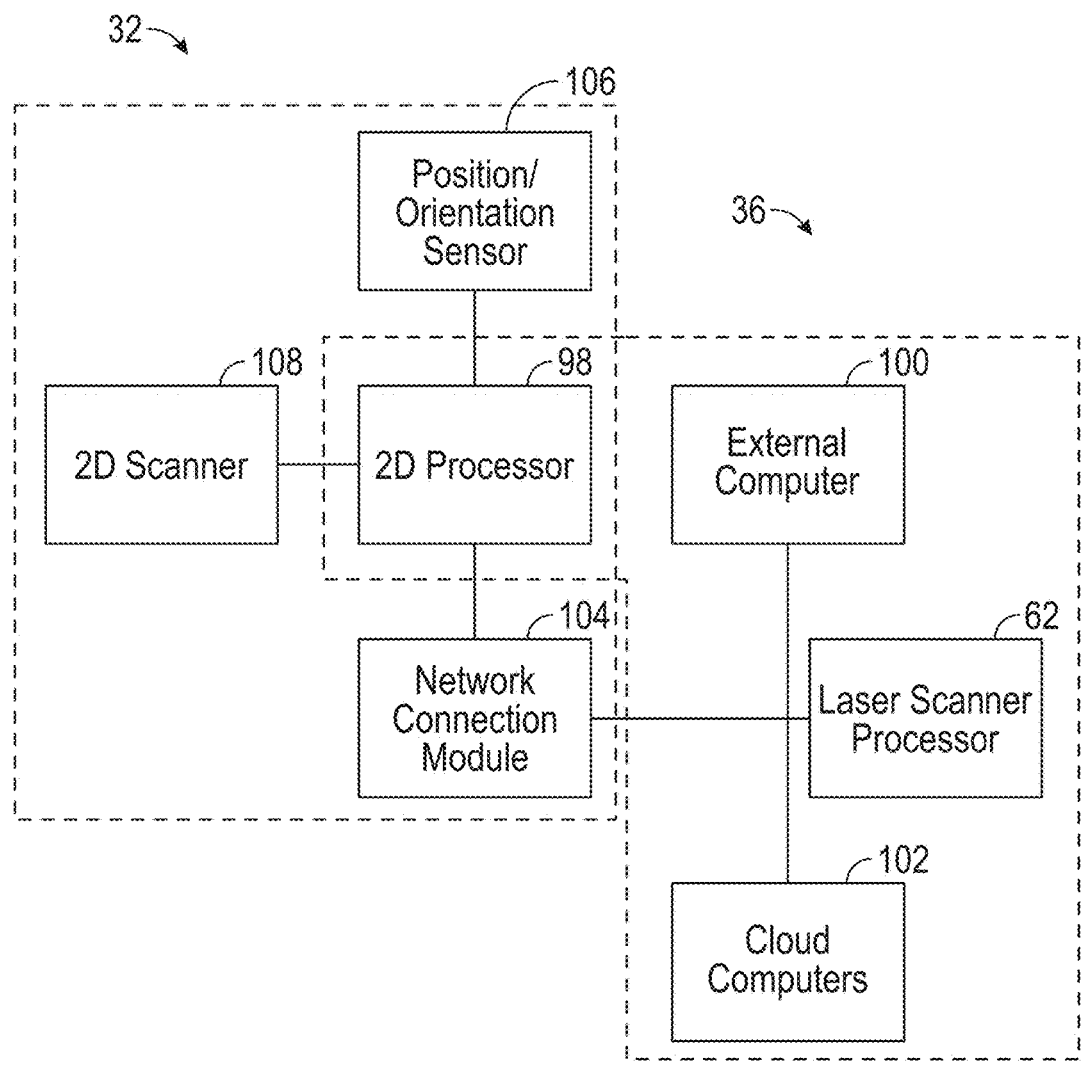
FIG. 6 is a block diagram depicting a measurement system and a processor system according to an embodiment.

Referring now to FIG. 6, the processor system 36 includes one or more processing elements that may include a laser scanner processor (controller) 62, 2D processor 98, an external computer 100, and a cloud computer 102. It should be appreciated that cloud computer 102 refers to one or more computing devices connected for communications via a network, such as the internet for example. The computing devices may be arranged in a distributed arrangement to operate cooperatively to process data from the processor system 36. The processors may be microprocessors, field programmable gate arrays (FPGAs), digital signal processors (DSPs), and generally any device capable of performing computing functions. The one or more processors have access to memory (volatile or nonvolatile) for storing information. In an embodiment illustrated in FIG. 6, the controller 62 represents one or more processors distributed throughout the system 30. Also included in the embodiment of FIG. 6 are 2D processor 98 for the 2D scanner 34, an external computer 100, and one or more cloud computers 102 for remote computing capability. In another embodiment, only one or more of the processors 62, 98, 100, and 102 may be combined or integrated within the processor system. Communication between the processors may be through a wired, wireless, or a combination of wired and wireless data connection or medium. In an embodiment, the connection between the processor 98 of the 2D scanner 34 and the processor 62 of laser scanner 32 is made by IEEE 802.11 (Wi-Fi) through the network connection module 104. In an embodiment, scan results are uploaded after each scanning session to a remote network (e.g. a cloud or distributed network) via a local area network or a wide area network for storage and future use.

The 2D scanner 36 measures 2D coordinates in a plane. In most cases, it does this by steering light within a plane to illuminate object points in the environment. It collects the reflected (scattered) light from the object points to determine 2D coordinates of the object points in the 2D plane. In an embodiment, the 2D scanner scans a spot of light over an angle while at the same time measuring an angle value and corresponding distance value to each of the illuminated object points.

Examples of 2D scanner assemblies 108 include but are not limited to 2D scanners from the Sick LMS100 product family and 2D scanners from Hoyuko such as the Hoyuko models URG-04LX-UG01 and UTM-30LX. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. Many other types of 2D scanners are also commercially available.

In an embodiment, an optional position/orientation sensor 106 in the 2D scanner accessory 32 may include inclinometers (accelerometers), gyroscopes, magnetometers, and altimeters. Usually devices that include one or more of an inclinometer and gyroscope are referred to as an inertial measurement unit (IMU). In some cases, the term IMU is used in a broader sense to include a variety of additional devices that indicate position and/or orientation—for example, magnetometers that indicate heading based on changes in magnetic field direction relative to the earth's magnetic north and altimeters that indicate altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices.

The moveable platform 38 enables the laser scanner 32 and 2D scanner 34 to be moved from place to place, typically along a floor that is approximately horizontal. In an embodiment, the moveable platform 38 is a tripod that includes wheels 40. In an embodiment, the wheels 40 may be locked in place using wheel brakes 42. In another embodiment, the wheels 40 are retractable, enabling the tripod to sit stably on three feet attached to the tripod. In another embodiment, the tripod has no wheels but is simply pushed or pulled along a surface that is approximately horizontal, for example, a floor. In another embodiment, the optional moveable platform 38 is a wheeled cart that may be hand pushed/pulled or motorized.

In an embodiment, the 2D scanner 34 is mounted between the moveable platform 38 and the laser scanner 32 as shown in FIG. 2. In another embodiment, the 2D scanner 34 is integrated into the laser scanner 32. In another embodiment, the 2D scanner 34 is mounted on the moveable platform 38, for example, on a leg of a tripod or between the legs of the tripod. In another embodiment, the 2D scanner 34 is mounted on the body of the laser scanner, for example. In another embodiment, the 2D scanner assembly 108 is attached to a leg of a tripod while other parts of the 2D scanner 32 are internal to the laser scanner 32.

In an embodiment, the 2D scanner assembly 108 is oriented so as to scan a beam of light over a range of angles in a horizontal plane. At instants in time the 2D scanner assembly 108 returns an angle reading and a corresponding distance reading to provide 2D coordinates of object points in the horizontal plane. In completing one scan over the full range of angles, the 2D scanner returns a collection of paired angle and distance readings. As the laser scanner 32 is moved from place to place, the 2D scanner 34 continues to return 2D coordinate values. These 2D coordinate values are used to locate the position of the system 30 at each stationary registration position, thereby enabling more accurate registration.

Figure 7:
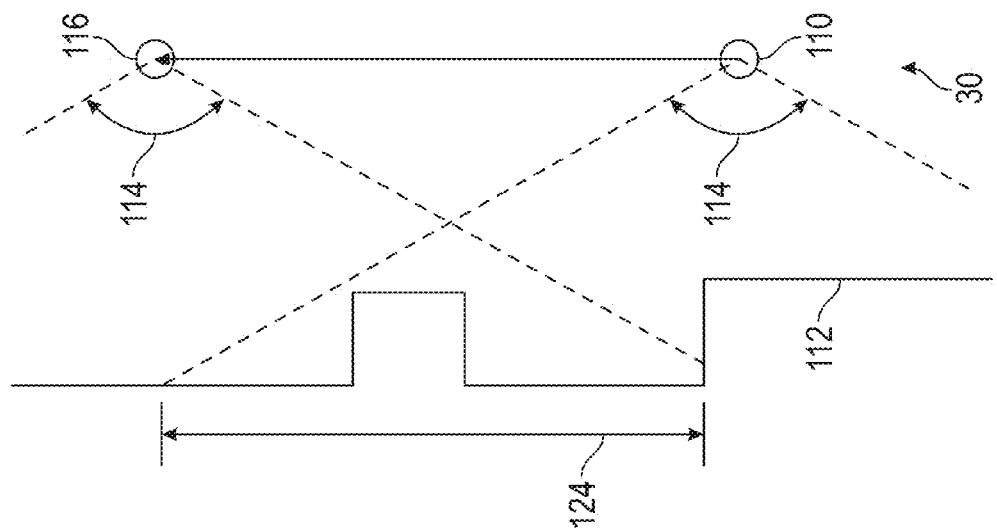
FIG. 7 is a schematic representation of a 3D scanner measuring an object from two registration positions according to an embodiment.

Referring now to FIG. 7, a movement of the system 30 from a first registration position 110 in front of an object 112 that is to be measured. The object 112 might for example be a wall in a room. In an embodiment, the system 30 is brought to a stop and is held in place with brakes, which in an embodiment are brakes 41 on wheels 39. The laser scanner 32 in system 30 takes a first 2D scan of the object 112. In an embodiment, the laser scanner 32 may, if desired, obtain 3D measurements in all directions except in downward (e.g. toward the floor/ground) directions blocked by the structure of the system 30. However, in the example of FIG. 7, in which laser scanner 32 measures a long, mostly flat structure 112, a smaller effective FOV 114 may be selected to provide a more face-on view of features on the structure.

When the first 2D scan by the laser scanner 32 is completed, the processor system 36 receives a signal indicating that 2D scan data is being collected. This signal may come from the position/orientation sensor 106 in response to the sensor 106 detecting a movement of the system 32 for example. The signal may be sent when the brakes 41 are released, or it may be sent in response to a command sent by an operator. The 2D scanner 34 may start to collect data when the system 30 starts to move, or it may continually collect 2D scan data, even when the 2D scanner 32 is stationary. In an embodiment, the 2D scanner data is sent to the processor system 36 as it is collected.

Figure 8:
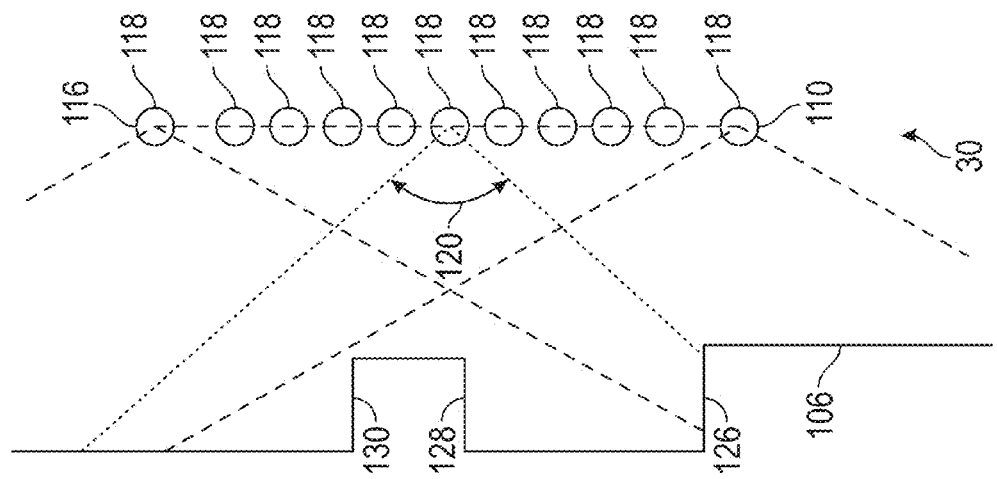
FIG. 8 is a schematic representation of a 2D scanner measuring the object from a plurality of intermediate positions according to an embodiment.

In an embodiment, the 2D scanner 34 measures as the system 30 is moved toward the second registration position 116. In an embodiment, 2D scan data is collected and processed as the scanner passes through a plurality of 2D measuring positions 118. At each measuring position 118, the 2D scanner 34 collects 2D coordinate data over an effective FOV 120 (FIG. 8). Using methods described in more detail below, the processor system 36 uses 2D scan data from the plurality of 2D scans at positions 118 to determine a position and orientation of the system 30 at the second registration position 116 relative to the first registration position 110, where the first registration position and the second registration position are known in a coordinate system common to both. In an embodiment, the common coordinate system is represented by 2D Cartesian coordinates x, y and by an angle of rotation θ relative to the x or y axis. In an embodiment, the x and y axes lie in the plane of the scanner and may be further based on a direction of a "front" of the 2D scanner 34. An example of such an (x, y, θ) coordinate system is the coordinate system 122 of FIG. 11A.

On the object 112, there is a region of overlap 124 between the first 2D scan (collected at the first registration position 110) and the second 2D scan (collected at the second registration position 116). In the overlap region 124 there are registration targets (which may be natural features of the object 112) that are seen in both the first 2D scan and the second 2D scan. A problem that often occurs in practice is that, in moving the system 20 from the first registration position 110 to the second registration position 116, the processor system 36 loses track of the position and orientation of the system 20 and hence is unable to correctly associate the registration targets in the overlap regions to enable the registration procedure to be performed with the desired reliably. By using the succession of 2D scans, the processor system 36 is able to determine the position and orientation of the system 20 at the second registration position 116 relative to the first registration position 110. This information enables the processor system 36 to correctly match registration targets in the region of overlap 124, thereby enabling the registration procedure to be properly completed.

Figure 9:
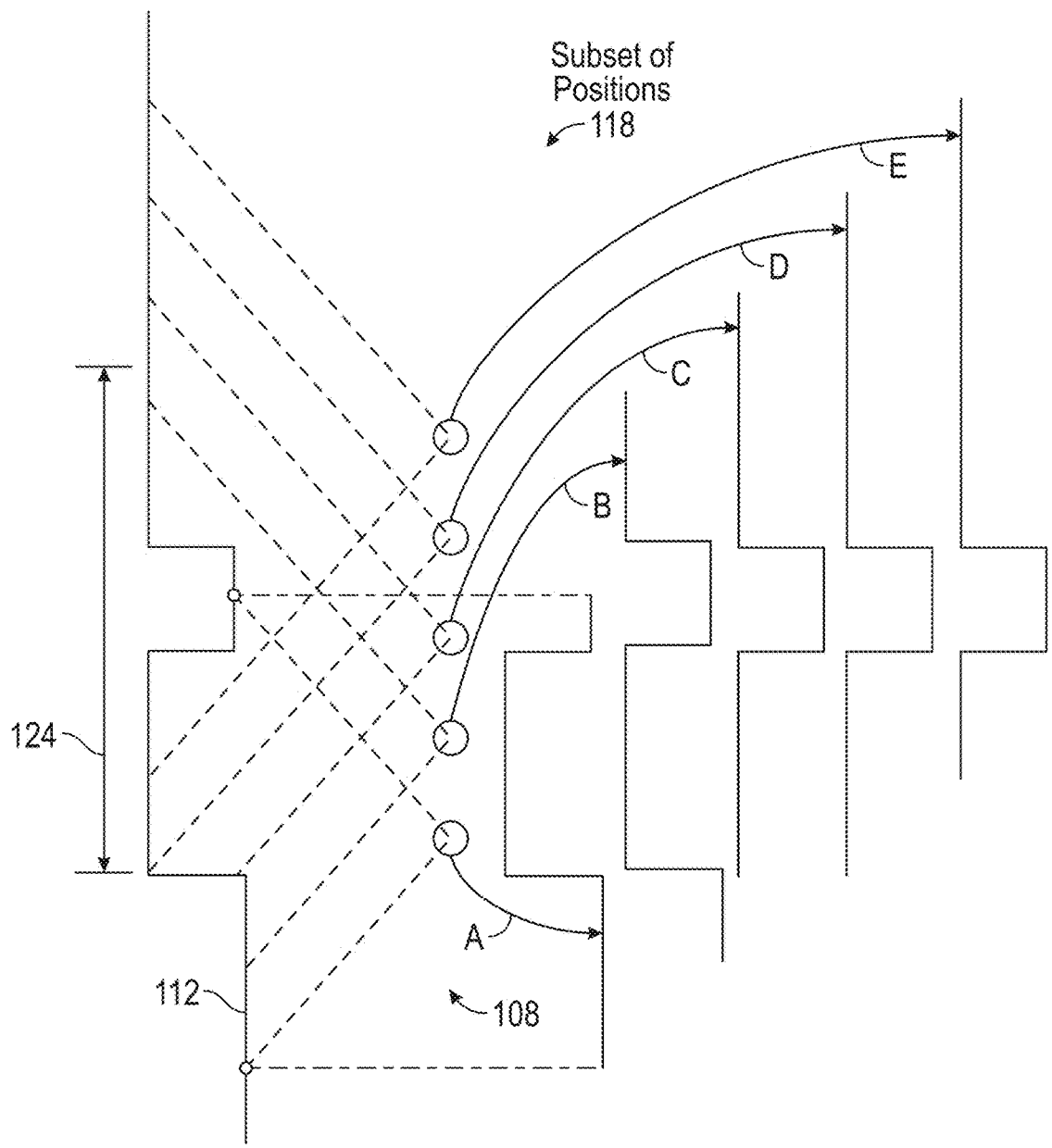
FIG. 9 is an illustration of a 2D scanner capturing portions of the object from a plurality of positions according to an embodiment.

FIG. 9 shows the 2D scanner 34 collecting 2D scan data at selected positions 118 over an effective FOV 120. At different positions 118, the 2D scanner assembly 108 captures a portion of the object 112 marked A, B, C, D, and E. FIG. 9 shows 2D scanner 34 moving in time relative to a fixed frame of reference of the object 112.

Figure 10:
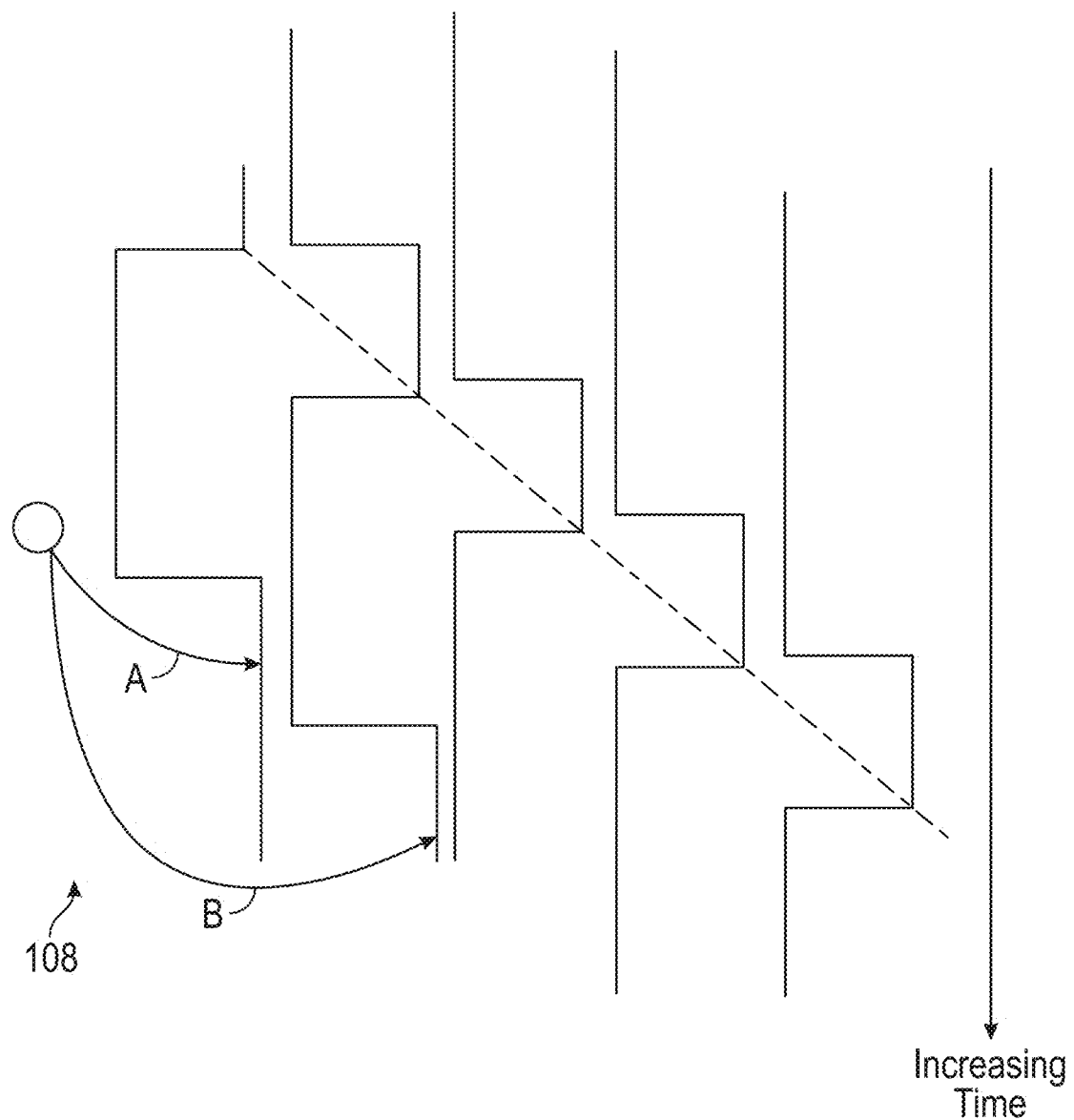
FIG. 10 is an illustration of the 2D scanner capturing portions of the object from a plurality of positions, as seen from a frame of reference of the 2D scanner, according to an embodiment.

FIG. 10 includes the same information as FIG. 9 but shows it from the frame of reference of the 2D scanner assembly 108 rather than the frame of reference of the object 112. This figure makes clear that in the 2D scanner frame of reference, the position of features on the object change over time. Hence it is clear that the distance traveled by the 2D scanner 34 can be determined from the 2D scan data sent from the 2D scanner assembly 108 to the processor system 36. As will be discussed in more detail below, where the position of the features remains fixed (e.g. a corner of a nonmovable structure), the features may be used to register the data. However, where a feature, such as a door for example, is scanned in one position and subsequently moved, this may cause issues with the registration, and particular with the orientation of the data acquired after movement. As discussed herein, one or more embodiments solve the issue of registering data that includes moved or movable features/structures.

Figure 11A:
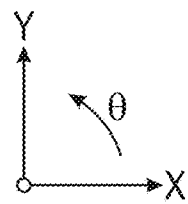
FIGS. 11A, 11B, and 11C illustrate a method for finding changes in the position and orientation of the 2D scanner over time according to an embodiment.
Figure 11B:
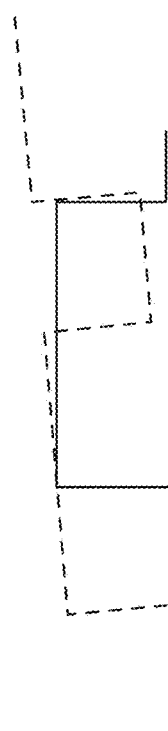
Figure 11B:
Figure 11C:
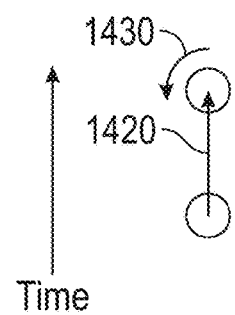

FIG. 11A shows a coordinate system that may be used in FIGS. 11B and 11C. In an embodiment, the 2D coordinates x and y are selected to lie on the plane of the 2D scanner 34. The angle θ is selected as a rotation angle relative to an axis such as x or y. FIGS. 11B, 11C represent a realistic case in which the 2D scanner 34 is moved not exactly on a straight line, for example, nominally parallel to the object 112, but also to the side. Furthermore, the 2D scanner 34 may be rotated as it is moved.

FIG. 11B shows the movement of the object 112 as seen from the frame of reference of the 2D scanner 34. In the 2D scanner frame of reference (that is, as seen from the 2D scanners point of view), the object 112 is moving while the 2D scanner 34 is fixed in place. In this frame of reference, the portions of the object 112 seen by the 2D scanner 34 appear to translate and rotate in time. The 2D scanner assembly 108 provides a succession of such translated and rotated 2D scans to the processor system 36. In the example shown in FIG. 11A and FIG. 11B, the scanner translates in the +y direction by a distance 1420 shown in FIG. 14B and rotates by an angle 1430, which in this example is +5 degrees. Of course, the scanner could equally well have moved in the +x or −x direction by a small amount. To determine the movement of the 2D scanner 34 in the x, y, θ directions, the processor system 36 uses the data recorded in successive scans as seen in the frame of reference of the 2D scanner 34, as shown in FIG. 11B. In an embodiment, the processor system 36 performs a best-fit calculation using methods known in the art to match the two scans or features in the two scans as closely as possible.

As the 2D scanner 34 takes successive 2D measurements and performs best-fit calculations, the processor system 36 keeps track of the translation and rotation of the 2D scanner 34, which is the same as the translation and rotation of the laser scanner 32 and the system 30. In this way, the processor system 36 is able to accurately determine the change in the values of x, y, θ as the system 30 moves from the first registration position 110 to the second registration position 116.

It should be appreciated that the processor system 36 determines the position and orientation of the system 30 based on a comparison of the succession of 2D scans and not on fusion of the 2D scan data with scan data provided by the laser scanner 32 at the first registration position 110 or the second registration position 116.

Instead, in an embodiment, the processor system 36 is configured to determine a first translation value, a second translation value, and a first rotation value that, when applied to a combination of the first 2D scan data and second 2D scan data, results in transformed first 2D data that matches (or matches within a threshold) transformed second 2D data as closely (or within a predetermined threshold) as possible according to an objective mathematical criterion. In general, the translation and rotation may be applied to the first scan data, the second scan data, or to a combination of the two. For example, a translation applied to the first data set is equivalent to a negative of the translation applied to the second data set in the sense that both actions produce the same match in the transformed data sets. In an embodiment, an example of an "objective mathematical criterion" is that of minimizing the sum of squared residual errors for those portions of the scan data judged to overlap. In another embodiment, the objective mathematical criterion may involve a matching of multiple features identified on the object. For example, such features might be the edge transitions 126, 128, and 130 shown in FIG. 8. The mathematical criterion may involve processing of the raw data provided by the 2D scanner 34 to the processor system 36, or it may involve a first intermediate level of processing in which features are represented as a collection of line segments using methods that are known in the art, for example, methods based on the Iterative Closest Point (ICP). Such a method based on ICP is described in Censi, A., "An ICP variant using a point-to-line metric," IEEE International Conference on Robotics and Automation (ICRA) 2008.

In an embodiment, the first translation value is dx, the second translation value is dy, and the first rotation value dθ. If the first scan data is collected with the 2D scanner assembly 108 having translational and rotational coordinates (in a reference coordinate system) of $(x_1, y_1, \theta_1)$, then when the second 2D scan data is collected at a second location the coordinates are given by $(x_2, y_2, \theta_2)=(x_1+d_x, y_1+dy, \theta_1+d\theta)$. In an embodiment, the processor system 36 is further configured to determine a third translation value (for example, dz) and a second and third rotation values (for example, pitch and roll). The third translation value, second rotation value, and third rotation value may be determined based at least in part on readings from the position/orientation sensor 106.

The 2D scanner 34 acquires 2D scan data at the first registration position 110 and more 2D scan data at the second registration position 116. In some cases, these scans may suffice to determine the position and orientation of the system 30 at the second registration position 116 relative to the first registration position 110. In other cases, the two sets of 2D scan data are not sufficient to enable the processor system 36 to accurately determine the first translation value, the second translation value, and the first rotation value. This problem may be avoided by collecting 2D scan data at intermediate scan positions 118. In an embodiment, the 2D scan data is acquired and processed at regular intervals, for example, once per second. In this way, features of the object 112 are easily identified in successive 2D scans acquired at intermediate scan positions 118. If more than two 2D scans are obtained, the processor system 36 may choose to use the information from all the successive 2D scans in determining the translation and rotation values in moving from the first registration position 110 to the second registration position 116. In other embodiments, the processor system 36 may be configured to use only the first and last scans in the final calculation, simply using the intermediate 2D scans to ensure desired correspondence of matching features. In some embodiments, accuracy of matching is improved by incorporating information from multiple successive 2D scans.

The first translation value, the second translation value, and the first rotation value are the same for the 2D scanner 34, the laser scanner 32, and the system 30 since all are fixed relative to each other.

The system 30 is moved to the second registration position 116. In an embodiment, the system 30 is brought to a stop and brakes (such as wheel brakes 41 for example) are locked to hold the system 30 stationary. In another embodiment, the processor system 36 starts the laser scanner 32 automatically when the moveable platform is brought to a stop, for example, by the position/orientation sensor 106 determining the lack of movement. The laser scanner 32 of system 30 scan the object 112 to obtain coordinate data in the plane defined by the axes 44, 48. This scan is referred to as the second laser scan to distinguish it from the first laser scan performed at the first registration position 110.

The processor system 36 applies the already calculated first translation value, the second translation value, and the first rotation value to adjust the position and orientation of the second laser scan relative to the first laser scan. This adjustment, which may be considered to provide a "first alignment," brings the registration targets (which may be natural features in the overlap region 1150) into close proximity. The processor system 950 performs a fine registration in which it makes fine adjustments to the six degrees of freedom of the second laser scan relative to the first laser scan. It makes the fine adjustment based on an objective mathematical criterion, which may be the same as or different than the mathematical criterion applied to the 2D scan data. For example, the objective mathematical criterion may be that of reducing or minimizing the sum of squared residual errors for those portions of the scan data judged to overlap. In another embodiment, the objective mathematical criterion may be applied to a plurality of features in the overlap region. The mathematical calculations in the registration may be applied to raw laser scan data or to geometrical representations of the laser scan data, for example, by a collection of line segments.

Outside the overlap region 124, the aligned values of the first laser scan and the second laser scan are combined in a registered laser data set. Inside the overlap region, the laser scan values included in the registered laser data set are based on some combination of laser scanner data from the aligned values of the first laser scan and the second laser scan.

Figure 12:
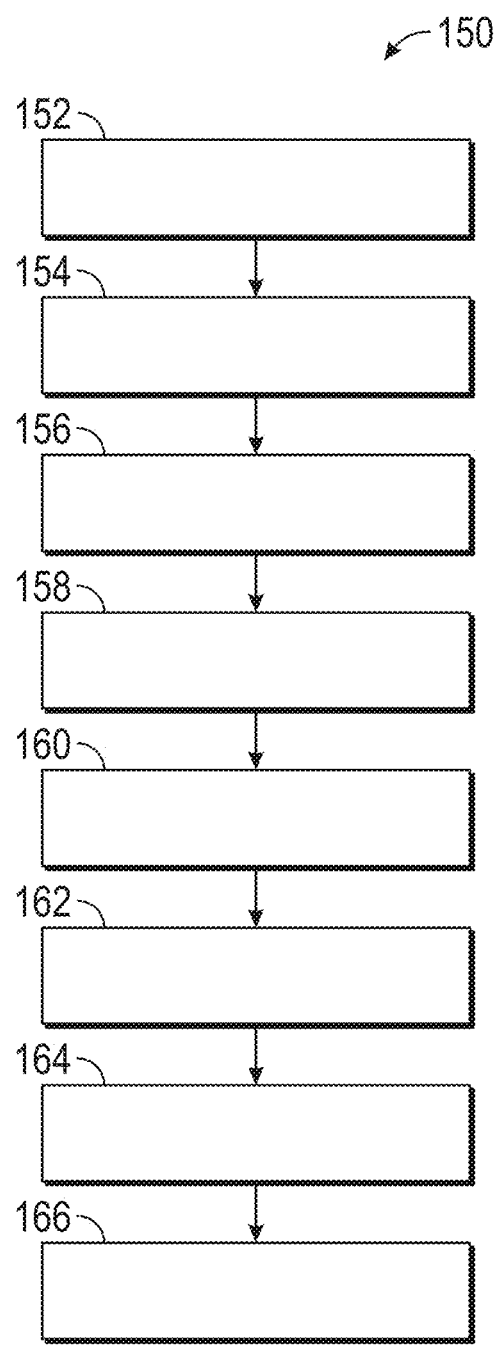
FIG. 12 is a flow diagram of a method of operating the mapping system.

Referring to FIG. 12, an embodiment is shown of a method 150 for measuring and registering coordinates obtained from the laser scanner 32. The method 150 starts in block 152 where a system 30 that includes a processor system, a laser scanner, a 2D scanner, and a moveable platform is provided. The processor system may include at least one of a laser scanner controller, a 2D scanner processor, an external computer, and a cloud computer configured for remote network access. Any of these processing elements within the processor system may include a single processor or multiple distributed processing elements, the processing elements being a microprocessor, digital signal processor, FPGA, or any other type of computing device. The processing elements have access to computer memory. The laser scanner has a first light source, a first beam steering unit, a first angle measuring device, and a first light receiver. In embodiments where the laser scanner acquires 3D coordinates, the laser scanner may further have a second angle measuring device. The first light source is configured to emit a first beam of light, which in an embodiment is a beam of laser light. The first beam steering unit is provided to steer the first beam of light to a first direction onto a first object point. The beam steering unit may be a rotating mirror such as the mirror 50 or it may be another suitable type of beam steering mechanism. Other types of beam steering mechanisms are possible. In some embodiments, a beam steering mechanism may include one or two motors.

The first direction is determined by a first angle of rotation about an axis (e.g. axis 48). The first angle measuring device is configured to measure the first angle of rotation. When 3D coordinates are acquired, the first direction may further be determined by a second angle of rotation about another axis (e.g. axis 44) and the second angle measuring device configured to measure the second angle of rotation. The first light receiver is configured to receive first reflected light, the first reflected light being a portion of the first beam of light reflected by the first object point. The first light receiver is further configured to produce a first electrical signal in response to the first reflected light. The first light receiver is further configured to cooperate with the processor system to determine a first distance to the first object point based at least in part on the first electrical signal, and the laser scanner is configured to cooperate with the processor system to determine coordinates of the first object point based at least in part on the first distance, the first angle of rotation and, when appropriate, the second angle of rotation.

The 2D scanner includes a 2D scanner assembly having a second light source, a second beam steering unit, a third angle measuring device, and a second light receiver. The second light source is configured to emit a second beam of light. The second beam steering unit is configured to steer the second beam of light to a second direction onto a second object point. The second direction is determined by a third angle of rotation about a third axis, the third angle measuring device being configured to measure the third angle of rotation. The second light receiver is configured to receive second reflected light, where the second reflected light is a portion of the second beam of light reflected by the second object point. The second light receiver is further configured to produce a second electrical signal in response to the second reflected light. The 2D scanner is configured to cooperate with the processor system to determine a second distance to the second object point based at least in part on the second electrical signal. The 2D scanner is further configured to cooperate with the processor system to determine 2D coordinates of the second object point based at least in part on the second distance and the third angle of rotation. The moveable platform is configured to carry the laser scanner and the 2D scanner. The laser scanner is fixed relative to the 2D scanner, and the moveable platform is configured for motion on a plane perpendicular to the third axis.

The method 150 then proceeds to block 154 where the processor system determines, in cooperation with the laser scanner, coordinates of a first collection of points on an object surface while the system is fixedly located at a first registration position. The method then proceeds to block 156 where the 2D scanner, in cooperation with the processor system, obtains or acquires a plurality of 2D scan sets. In an embodiment, each of the plurality of 2D scan sets is a set of 2D coordinates of points on the object surface collected as the 2D scanner moves from the first registration position to a second registration position. Each of the plurality of 2D scan sets is collected by the 2D scanner at a different position relative to the first registration position.

The method 150 then proceeds to block 158 where the processor system determines a first translation value corresponding to a first translation direction, a second translation value corresponding to a second translation direction, and a first rotation value corresponding to a first orientational axis, wherein the first translation value, the second translation value, and the first rotation value are determined based at least in part on a fitting of the plurality of 2D scan sets according to a first mathematical criterion.

The method 150 then proceeds to block 160 where the processor system determines, in cooperation with the laser scanner, coordinates of a second collection of points on the object surface while the system is fixedly located at the second registration position. The method 150 then proceeds to block 162 where the processor system identifies a correspondence among registration targets present in both the first collection of points and the second collection of points, the correspondence based at least in part on the first translation value, the second translation value, and the first rotation value.

The method 150 then proceeds to block 164 where the 2D coordinates of a registered 2D collection of points are determined based at least in part on a second mathematical criterion, the correspondence among the registration targets, the 2D coordinates of the first collection of points and the 2D coordinates of the second collection of points. The method 150 stores in memory in block 166 the 2D coordinates of the registered 2D collection of points.

Figure 1:
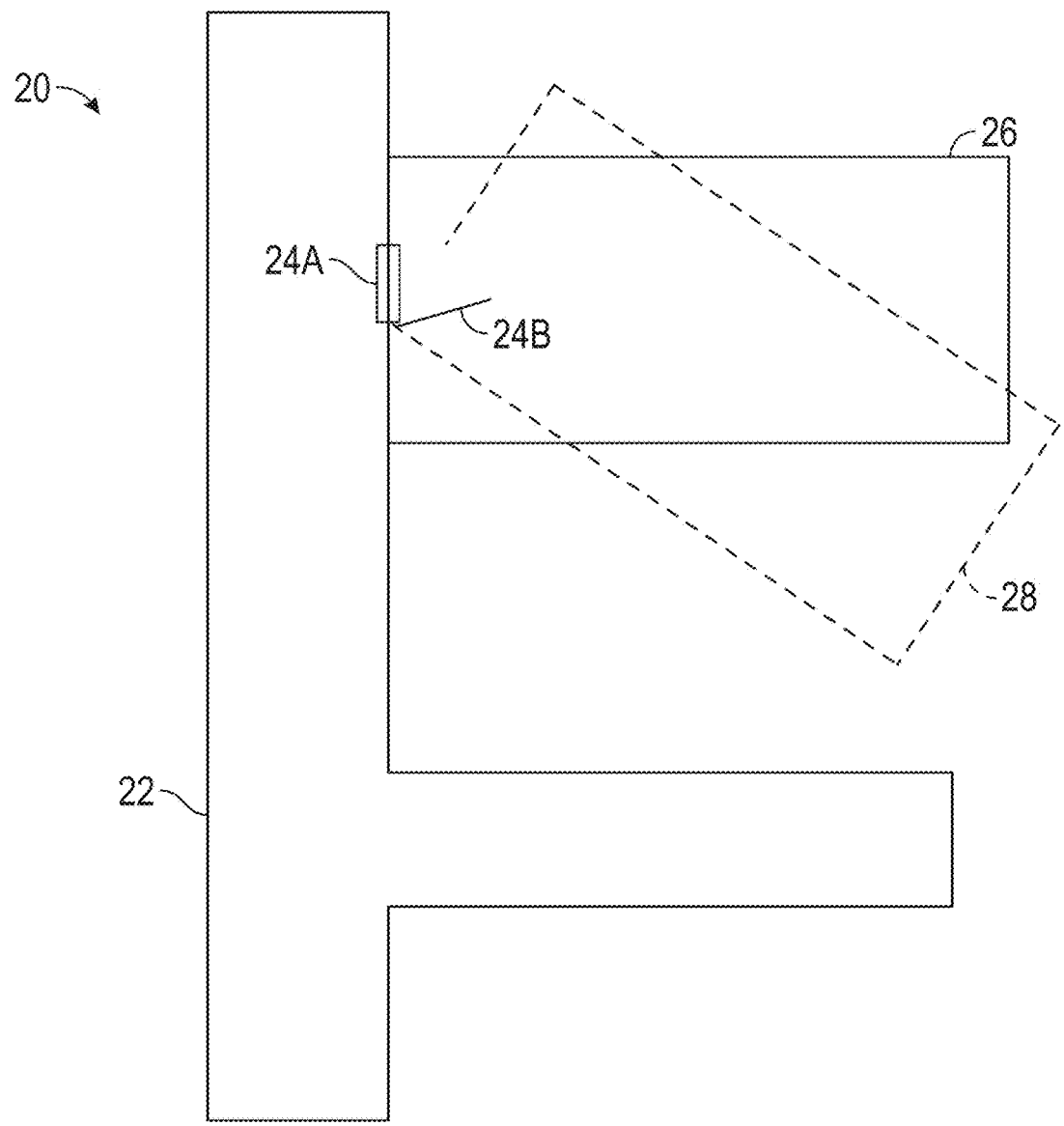
FIG. 1 is an illustration of a two-dimensional map of an area generated by a prior art mapping system.
Figure 15:
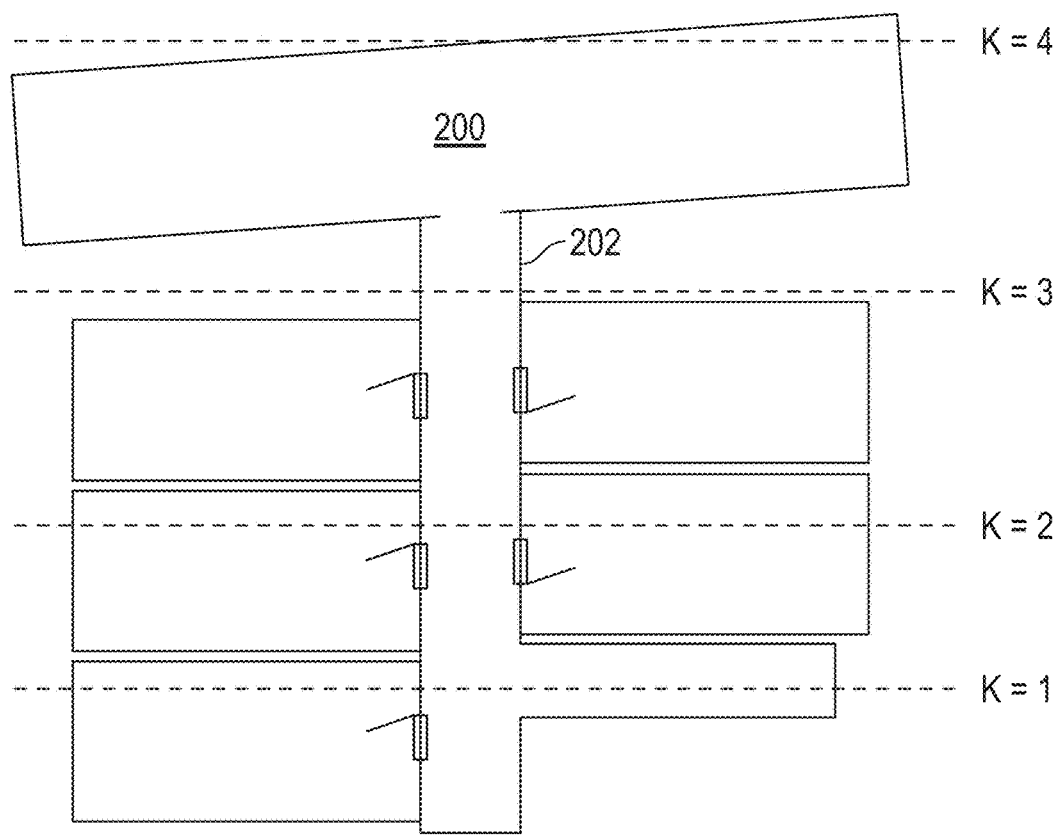
FIG. 15, FIG. 16 and FIG. 17 are illustrations of 2D map data acquired by the system of FIG. 2.
Figure 16:
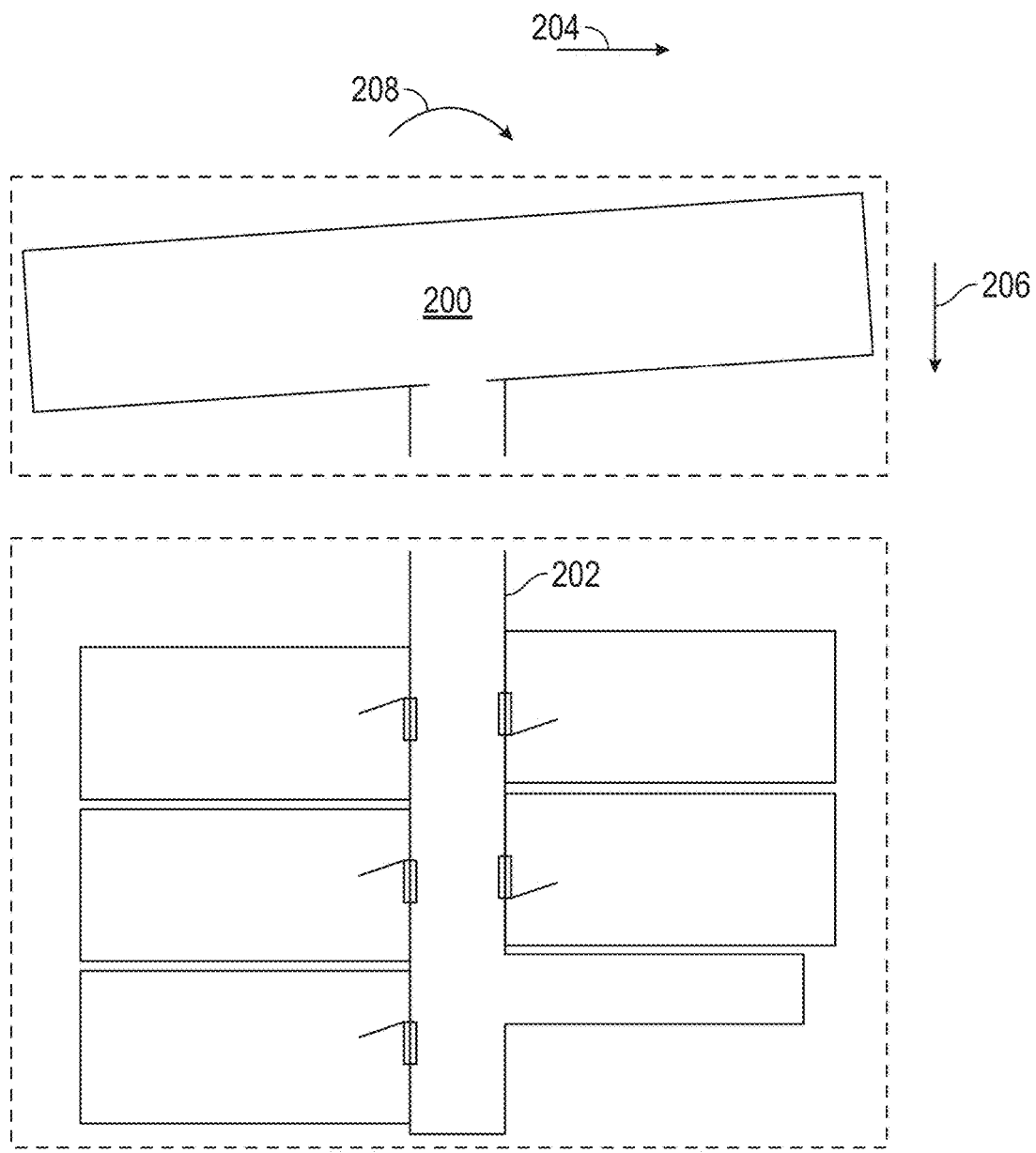

These stored 2D coordinates may then be used to generate 2D maps of the area being scanned, such as that shown in FIG. 1. During the scanning process, there is a potential for errors to occur in the registration of the 2D collection of points. These errors may occur, for example, if a natural feature used in the registration process is moved (e.g. a door is opened). Another type of registration error is sometimes referred to as a "loop." In this type of error, the operator moves the system through the environment in a closed loop path, in other words the beginning and the end of the scan occur at the same location. As errors accumulate during the scanning process, the location of the end point (in the scan data) may not coincide with the start point. When an error in the registration occurs the graphical representation (e.g. the 2D map) of the points in the 2D collection of points that are acquired after the error in registration occurs may not be properly aligned (x or y shifted) or oriented (yaw) relative to the earlier acquired points. An example of an error in registration is shown in FIG. 15 that resulted in a room 200 being on an angle relative to the adjacent hallway 202. It should be appreciated that it is desirable to be able to adjust the 2D collection of points and the 2D map to correct for the error.

Figure 13:
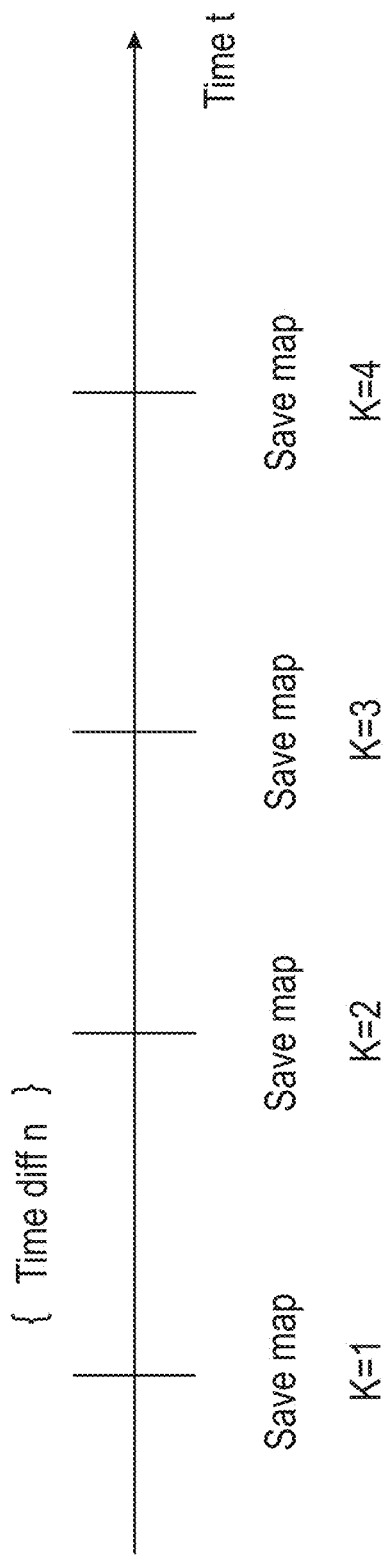
FIG. 13 is a timeline diagram illustrating the saving of map snapshots with the mapping system in accordance with an embodiment.

In accordance with an embodiment, the system 30 is configured to periodically store a copy of the 2D collection of points in memory such that it may be later recalled. This storage of the copy of the 2D collection of points may colloquially be referred to as a "snapshot," meaning that it provides a copy of the data at a particular point in time. As shown in FIG. 13, the method 150 may be performed over the course of time T. At predetermined time periods, a copy "K" of the 2D collection of points is stored. It should be appreciated that the number of snapshots of the 2D collection of points that may be stored is based on the amount of memory that the system 30 has, or has access to. In the exemplary embodiment, the system 30 saves up to four snapshots of the 2D collection of points. After the fourth snapshot is saved, at the next point where the data is to be saved (e.g. after the predetermined time period) the system 30 overwrites the oldest saved snapshot (e.g. K=1). It should be appreciated that the number of snapshots described herein is for exemplary purposes and that the system 30 may save more or fewer snapshots.

Figure 14:
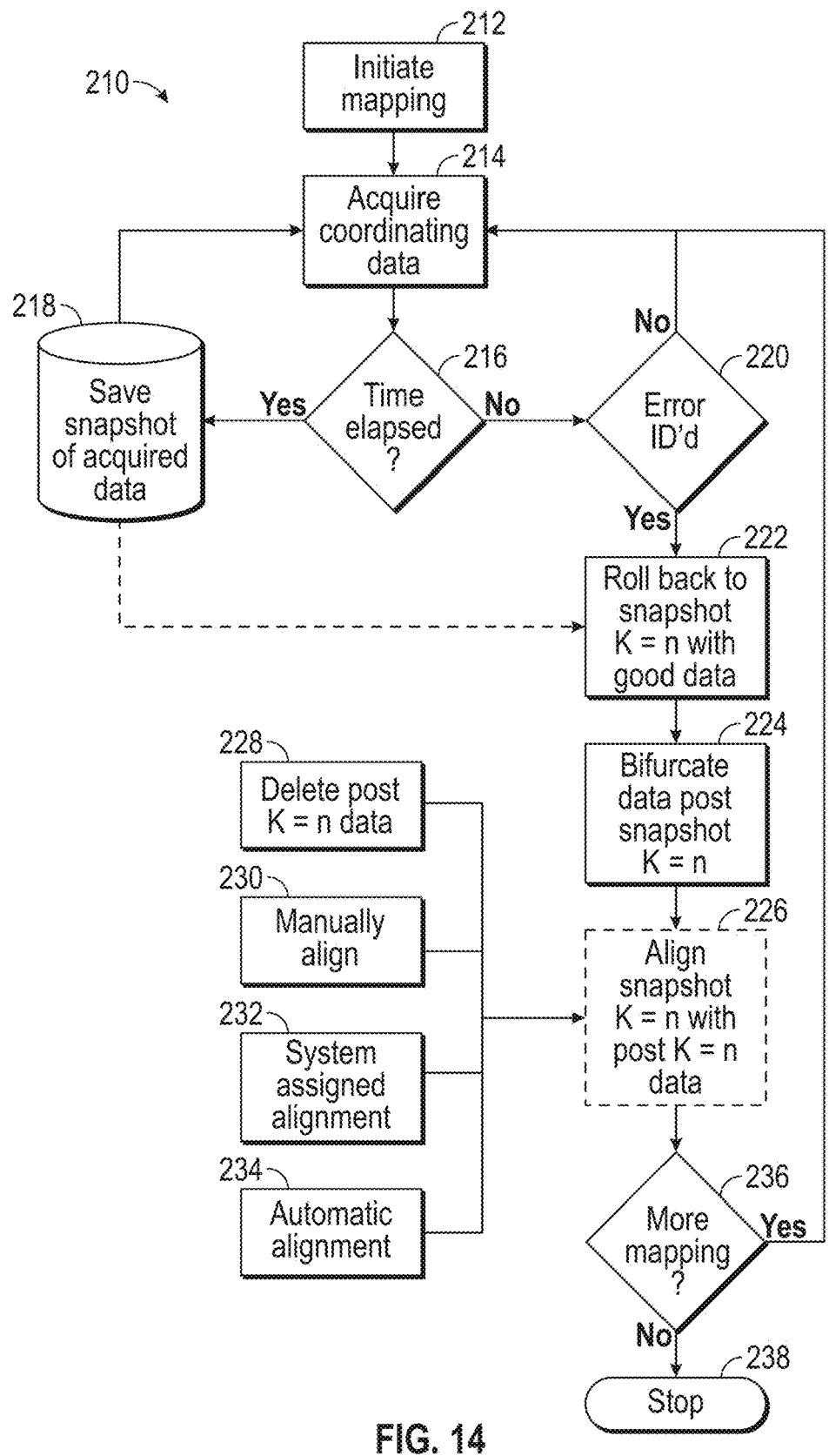
FIG. 14 is a flow diagram illustrating a method of operating the mapping system in accordance with an embodiment.

Referring now to FIG. 14, a method 210 is shown for correcting the 2D collection of points after an error in registration has occurred. The method 210 starts in block 212 where mapping/scanning is initiated. The method 210 then proceeds to block 214 where coordinate data for the points in the area being scanned are acquired. In an embodiment, the method 150 described in reference to FIG. 12 is performed in block 214. The method 210 then proceeds to query block 216 where it is determined if the predetermined amount of time has elapsed. When query block 216 returns a positive, the method 210 proceeds to block 218 where a snapshot "K" is saved to memory and the method loops back to block 214.

When query block 216 returns a negative, the method 210 proceeds to query block 220 where it is determined if an error in the registration has been identified. When the query block 216 returns a negative, the method 210 loops back to block 214 and continues to acquire coordinate data. When the query block 220 returns a positive, meaning an error has been identified, the method 210 proceeds to block 222. In an embodiment, the identification of the registration error may be determined visually by the operator. In other embodiments, the detection of the registration error may be automated, for example by comparing the 2D map with a previous map of the area. For example, in an embodiment where the 2D map is being made of a building interior, the 2D map may be compared with the design layout drawings (e.g. blueprints) for the building. When the 2D map deviates from the design layout greater than a threshold, a signal may be generated that notifies the operator.

In block 222, the snapshot "K=n" with the last known correct data (e.g. data without registration errors) is identified from the saved snapshot data. In the example of FIG. 15, four snapshots, K=1, K=2, K=3 and K=4 were acquired during the scan. It was identified that the data for room 200 is mis-registered relative to the hallway 202. Since the hallway 202 appears to be correct, the snapshot K=3 is determined to be the last snapshot with the correct data. The method 210 then proceeds to block 224 where the coordinate data in the 2D collection of points that was acquired after the snapshot with the correct data (e.g. data acquired after snapshot K=3) is bifurcated from the earlier data set.

The method 210 then proceeds to block 226 where the data with no registration errors (e.g. snapshot K=3) is aligned with the later acquired data. In an embodiment, the alignment is performed by deleting (block 228) and reacquiring or rescanning the mis-registered area. In this embodiment, the system 30 is relocated back to the location of the identified snapshot (K=3) and the 2D coordinate data is reacquired. In the embodiment of FIG. 15, the end of the hallway 202 and the room 200 are rescanned. It should be appreciated that in an embodiment where the mis-registered portion of the data is deleted, the data set may not be bifurcated but rather the snapshot with known correct data (e.g. snapshot K=3) may be recalled and used to replace the current data set.

Figure 17:
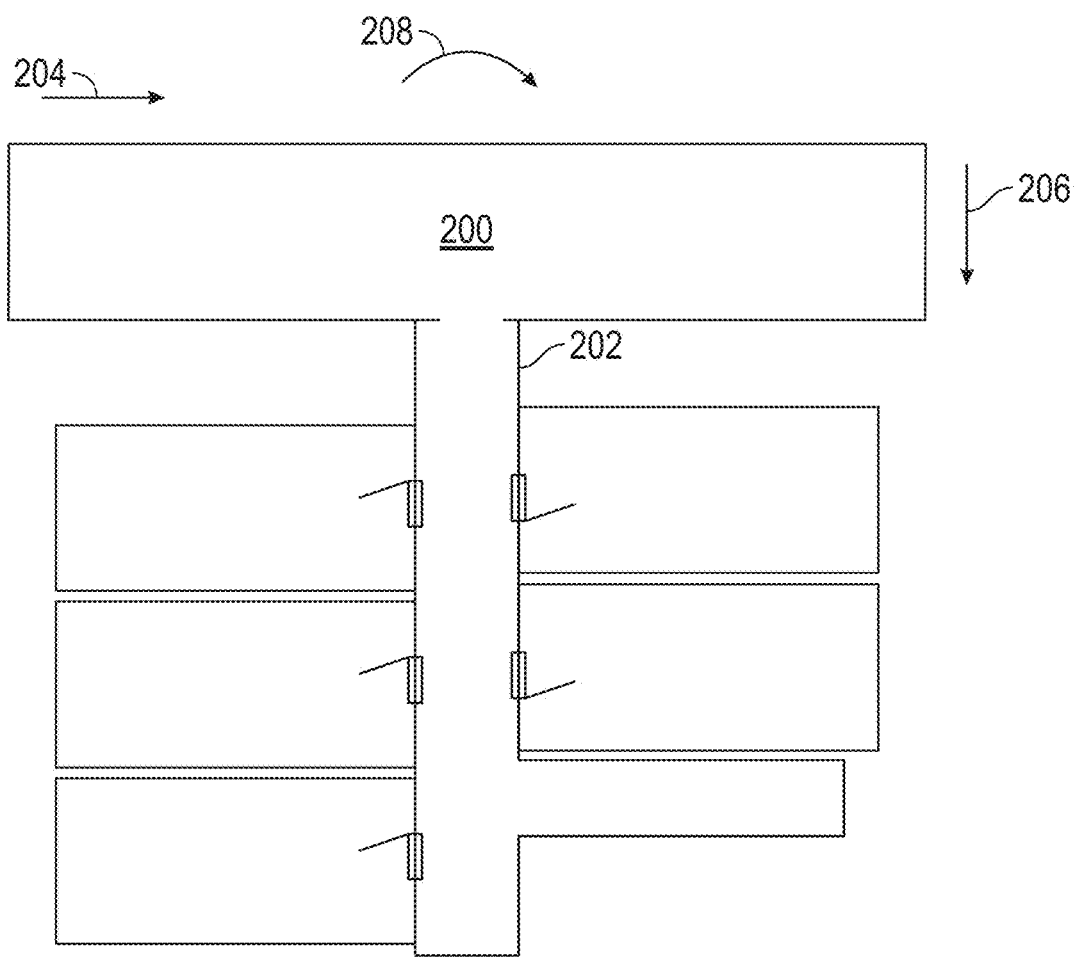

In another embodiment, the operator may manually realign the data to correct for the erroneous shift (x or y) or orientation (yaw) in the data. As illustrated in FIG. 6, the data acquired after snapshot K=3 is bifurcated or separated from the earlier 2D collection of points. The operator may then move (as indicated by the arrows 204, 206) and rotate (as indicated by the arrow 208) until the two data sets are aligned as shown in FIG. 17. Once the data sets are aligned, the 2D collection of points may be stored as a snapshot (e.g. K=4).

In another embodiment of block 232, the operator adjusts the position and orientation of the second data set, meaning the data acquired after the last known snapshot with correct data. In this embodiment, the method 210 identifies natural features in the 2D map, such as corners of hallways, posts or columns for example, that overlap with the second data set. When the operator adjusts the position and orientation of the later data relative to the earlier data, the method 210 snaps or automatically positions the later data based on the natural features being aligned within a predetermined threshold.

In still another embodiment of block 234, the alignment of the second data set is automatically aligned. In this embodiment the geometrical structure of the snapshot data set is matched against second data set until an overlay is reached within a predetermined probability threshold. In this embodiment a line matching methodology such as Iterative Closest Point (ICP) for example, may be used for the alignment of the data sets. Once the 2D map of the second data set is in the correct position the offset vector from the previous map origin to the new map origin is determined in the coordinate system of the previous map. This vector will be automatically applied to all positions in the new map. This process may be repeated n times. At the end a correct complete map is generated consisting of the single maps in the coordinate system of the original coordinate system.

Once the data set for the 2D collection of points is aligned (or reacquired), the method 210 proceeds to query block 236 where it is determined if additional mapping is desired. When the query block 236 returns a positive, meaning additional mapping is to be performed, the method 210 loops back to block 214. When the query block 236 returns a negative, the method 210 proceeds to block 238 and stops.

It should be appreciated that while embodiments herein describe the system and method for aligning mis-registered 2D data, this is for exemplary purposes and the claimed invention should not be so limited. In other embodiments, the laser scanner 32 acquires 3D data. In some embodiments, the 2D map may be generated from the 3D data. In other embodiments, data sets consisting of 3D collection of points may be registered and aligned as described herein.

Technical effects and benefits of some embodiments include providing a system and method for correcting of map data generated by scanning where an error occurs in the registration of the coordinates of points acquired during the scan. A further technical effect and benefit is to allow for acquisition of map data, such as an as-built map of a building, in less time with improved accuracy.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A method of generating a two-dimensional (2D) map, the method comprising:
   acquiring coordinate data of points in an area being scanned with a mobile optical scanner;
   generating a current 2D map from the coordinate data;
   saving a copy of the current 2D map on a periodic or aperiodic basis;
   identifying at least one data registration error in the current 2D map;
   determining the saved copy of the current 2D map from a point in time prior to the registration error;
   identifying a second data set of coordinate data acquired after the determined saved copy;

aligning the second data set to the determined saved copy to form a new current 2D map; and
storing the new current 2D map.

2. The method of claim 1 wherein the aligning of the second data set comprises deleting the second data set and re-scanning a portion of the area associated with the second data set.

3. The method of claim 1 wherein the aligning of the second data set comprises performing by the operator at least one of a shift or a rotation of the second data set relative to the determined saved copy.

4. The method of claim 1 wherein the aligning of the second data set comprising:
performing by the operator at least one of a shift or a rotation of the second data set relative to the determined saved copy;
identifying overlapping natural features in the determined saved copy and the second data set; and
automatically shifting and rotating the second data set with the determined saved copy when the overlapping natural features are aligned by the operator within a predetermined threshold.

5. The method of claim 1 wherein the aligning of the second data set comprises
comparing the determined saved copy against second data set until an overlay is reached within a predetermined probability threshold;
determining the offset vector from a previous map origin to a new map origin in a coordinate system of a previous map; and
applying the offset vector to all positions in a new map.

6. A method of generating a two-dimensional map with a scanner, the method comprising:
acquiring a first set coordinate data with an optical scanner;
determining a predetermined amount of time has elapsed or a predetermined distance has been scanned;
storing in memory of a processor operably coupled to the optical scanner a first copy of a two-dimensional map generated from the first set of coordinate data acquired during the predetermined amount of time or the predetermined distance;
acquiring a second set of coordinate data with the optical scanner;
generating a current two-dimensional map based at least in part on the first set of coordinate data and the second set of coordinate data;
determining a registration error in the current two-dimensional map;
determining the first copy does not include the registration error;
registering the second set of coordinate data with the first copy; and
replacing the current two-dimensional map with a new two-dimensional map based at least in part on the registration of the second set of coordinate data to the first copy.

7. The method of claim 6, wherein the step of registering the second set of coordinate data further includes manually aligning, by the operator, the second set of coordinate data to the first copy.

8. The method of claim 6, wherein the step of registering the second set of coordinate data further comprises:
manually aligning, by the operator, the second set of coordinate data to the first copy; and
automatically moving and aligning the second set of coordinate data when the operator has moved the second set of coordinate data within a predetermined distance of the first copy.

9. The method of claim 6, wherein the step of registering the second set of coordinate data further comprises:
matching a geometrical structure of the first copy with the second set of coordinate data; and
aligning the first copy and the second set of coordinate data when an overlay of the geometrical structure is within a predetermined probability threshold.

10. The method of claim 6, wherein the step of registering the second set of coordinate data comprises:
deleting the second set of coordinate data;
moving the optical scanner to a location in real-space adjacent an end of a geometrical structure of the first copy;
reacquiring a third set of coordinate data with the optical scanner, wherein the third set of coordinate data corresponds to an area covered by the second set of coordinate data.

11. The method of claim 6, further comprising bifurcating the current two-dimensional map to separate coordinate data acquired after the first copy was stored.

12. The method of claim 6, further comprising:
storing in memory of a processor operably coupled to the optical scanner a second copy of a two-dimensional map generated from a third set of coordinate data acquired during a second predetermined amount of time or a second predetermined distance;
storing in memory of a processor operably coupled to the optical scanner a third copy of a two-dimensional map generated from a fourth set of coordinate data acquired during a fourth predetermined amount of time or a fourth predetermined distance; and
in response to determining a registration error determining the which of the first copy, the second copy or the third copy that is latest in time that does not include the registration error.

13. A system of generating a two-dimensional map with a scanner, the system comprising:
an optical scanner;
one or more processors that are operably coupled to memory, the one or more processors being responsive to executable computer instructions, the executable computer instructions comprising
acquiring a first set coordinate data with the optical scanner;
determining a predetermined amount of time has elapsed or a predetermined distance has been scanned;
storing in the memory a first copy of a two-dimensional map generated from the first set of coordinate data acquired during the predetermined amount of time or the predetermined distance;
acquiring a second set of coordinate data with the optical scanner;
generating a current two-dimensional map based at least in part on the first set of coordinate data and the second set of coordinate data;
determining a registration error in the current two-dimensional map;
determining the first copy does not include the registration error;
registering the second set of coordinate data with the first copy; and replacing the current two-dimensional map with a new two-dimensional map based at least in part on the registration of the second set of coordinate data to the first copy.

14. The system of claim 13, wherein the step of registering the second set of coordinate data further includes manually aligning, by the operator, the second set of coordinate data to the first copy.

15. The system of claim 13, wherein the step of registering the second set of coordinate data further comprises:
manually aligning, by the operator, the second set of coordinate data to the first copy; and
automatically moving and aligning the second set of coordinate data when the operator has moved the second set of coordinate data within a predetermined distance of the first copy.

16. The system of claim 13, wherein the step of registering the second set of coordinate data further comprises:
matching a geometrical structure of the first copy with the second set of coordinate data; and
aligning the first copy and the second set of coordinate data when an overlay of the geometrical structure is within a predetermined probability threshold.

17. The system of claim 13, wherein the step of registering the second set of coordinate data comprises:
deleting the second set of coordinate data;
moving the optical scanner to a location in real-space adjacent an end of a geometrical structure of the first copy;
reacquiring a third set of coordinate data with the optical scanner, wherein the third set of coordinate data corresponds to an area covered by the second set of coordinate data.

18. The system of claim 13, further comprising bifurcating the current two-dimensional map to separate coordinate data acquired after the first copy was stored.

19. The system of claim 13, further comprising:
storing in memory of a processor operably coupled to the optical scanner a second copy of a two-dimensional map generated from a third set of coordinate data acquired during a second predetermined amount of time or a second predetermined distance;
storing in memory of a processor operably coupled to the optical scanner a third copy of a two-dimensional map generated from a fourth set of coordinate data acquired during a fourth predetermined amount of time or a fourth predetermined distance; and
in response to determining a registration error determining the which of the first copy, the second copy or the third copy that is latest in time that does not include the registration error.

* * * * *